(No Model.)

C. SAUTER.
CRYSTALLIZING PAN FOR ROCK CANDY.

No. 272,905. Patented Feb. 27, 1883.

Witnesses
W. A. Bertram
H. Demuth

Inventor
Charles Sauter
by
Brashears & Williams
Attorney

United States Patent Office.

CHARLES SAUTER, OF BALTIMORE, MARYLAND, ASSIGNOR TO CAELIUS O. DRYDEN AND NOAH PALMER, OF SAME PLACE.

CRYSTALLIZING-PAN FOR ROCK-CANDY.

SPECIFICATION forming part of Letters Patent No. 272,905, dated February 27, 1883.

Application filed January 24, 1883. (No model.)

*To all whom it may concern:*

Be it known that I, CHARLES SAUTER, a citizen of the United States, residing at Baltimore, Maryland, have invented certain new and useful Improvements in Crystallizing-Pans for Rock-Candy, of which the following is a specification, reference being had to the accompanying drawings, forming part hereof, in which—

Figure 1:
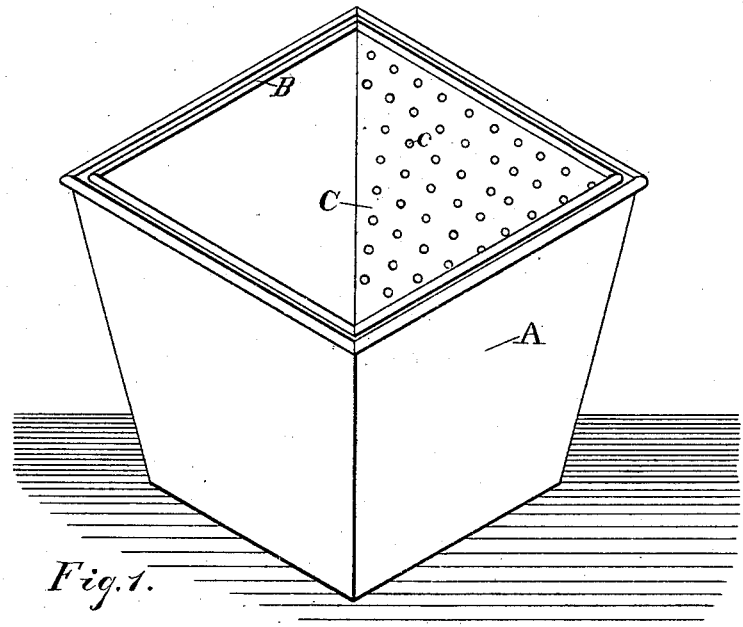
Figures 2, 3:
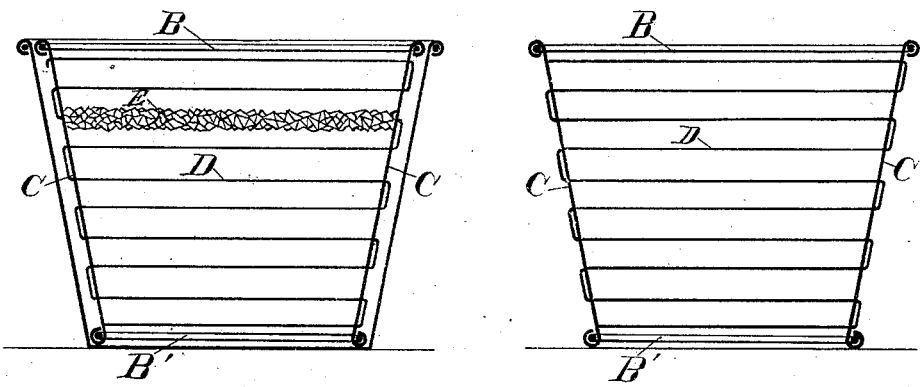

Figure 1 is a perspective view of my improved pan with the interior frame in place. Fig. 2 is a vertical sectional view of the interior frame, showing the cords; and Fig. 3 is a vertical sectional view of the pan complete, showing the cords, one of them being covered with crystals.

Referring to the drawings by letter, A is a pan of any desired shape, preferably having two opposite flat sides. Within said pan is a skeleton frame composed of two sides, C, perforated, as at *c*, and connecting and strengthening rings B B' at the top and bottom, respectively, composed of ordinary iron rods. This interior frame is of the same configuration as the pan A, and in use is placed within it, as shown in Figs. 1 and 3. Ordinary cord, D, is passed through the perforations *c*, and woven back and forth, as shown in Fig. 2. In practice I first weave the cords D in the frame, as just described. I then place the frame so prepared inside the pan and fill the pan with sirup properly prepared for the purpose. This is allowed to stand until crystallization is complete, when the cords will appear covered with rock-candy, as seen at E in Fig. 2.

The old and well-known method of making rock-candy is to take a pan with perforated sides, weave in the cord, and coat the outside with paste to prevent leakage of the sirup. In many cases leakage would occur in spite of the greatest precautions, occasioning vexatious annoyance and delay. The advantages of my plan are apparent at a glance, and need no further elucidation.

Having thus fully described my invention, what I claim as new, and desire to secure by Letters Patent of the United States, is—

1. The combination of the outer pan, A, with the inner frame composed of sides C and strengthening and supporting bars B B', the sides being perforated, as set forth.

2. The combination of the pan A and frame B B' C and cords D, as and for the purpose set forth.

3. A pan for crystallizing rock-candy, consisting of an outer vessel and an inner skeleton frame, the latter having its opposite sides perforated, whereby cords may be suspended across it for the purpose set forth.

In witness whereof I subscribe my name.

CHARLES SAUTER.

In presence of—
S. BRASHEARS,
JNO. T. MADDOX.